United States Patent [19]

Nakao et al.

[11] Patent Number: 4,699,858
[45] Date of Patent: Oct. 13, 1987

[54] SEPARATOR FOR AN ALKALINE BATTERY

[75] Inventors: Etsurou Nakao, Moriyama; Hiroaki Yamazaki; Masaki Hirooka, both of Ibaragi, all of Japan

[73] Assignee: Firma Carl Freudenberg, Weinheim/Bergstr., Fed. Rep. of Germany

[21] Appl. No.: 841,275

[22] Filed: Mar. 19, 1986

[30] Foreign Application Priority Data

Mar. 19, 1985 [JP] Japan ................................. 60-57042

[51] Int. Cl.$^4$ ............................................. H01M 2/16
[52] U.S. Cl. .................................... 429/254; 428/903; 429/247
[58] Field of Search ...................... 429/247, 249, 254; 264/115, 121, 176 F; 528/323, 326; 428/903

[56] References Cited

U.S. PATENT DOCUMENTS

| 2,071,253 | 1/1935 | Carothers | 528/323 |
| 3,147,150 | 9/1964 | Mendelsohn et al. | 136/143 |
| 4,034,144 | 7/1977 | Chireau | 429/247 |
| 4,551,402 | 11/1985 | Tamura et al. | |

FOREIGN PATENT DOCUMENTS

| 0109619 | 11/1982 | European Pat. Off. |
| 2164901 | 7/1973 | Fed. Rep. of Germany |
| 2224879 | 10/1974 | France |
| 1421775 | 1/1976 | United Kingdom |

Primary Examiner—James J. Bell
Attorney, Agent, or Firm—Felfe & Lynch

[57] ABSTRACT

Disclosed is a separator formed of a non-woven fabric having a ratio of $CONH/CH_2$ in the range of 1/9 to 1/12 for use in a battery. The seperator of the invention shows superior alkali/oxidation resistance with good electrolyte retainability resulting in a longer life battery.

21 Claims, 1 Drawing Figure

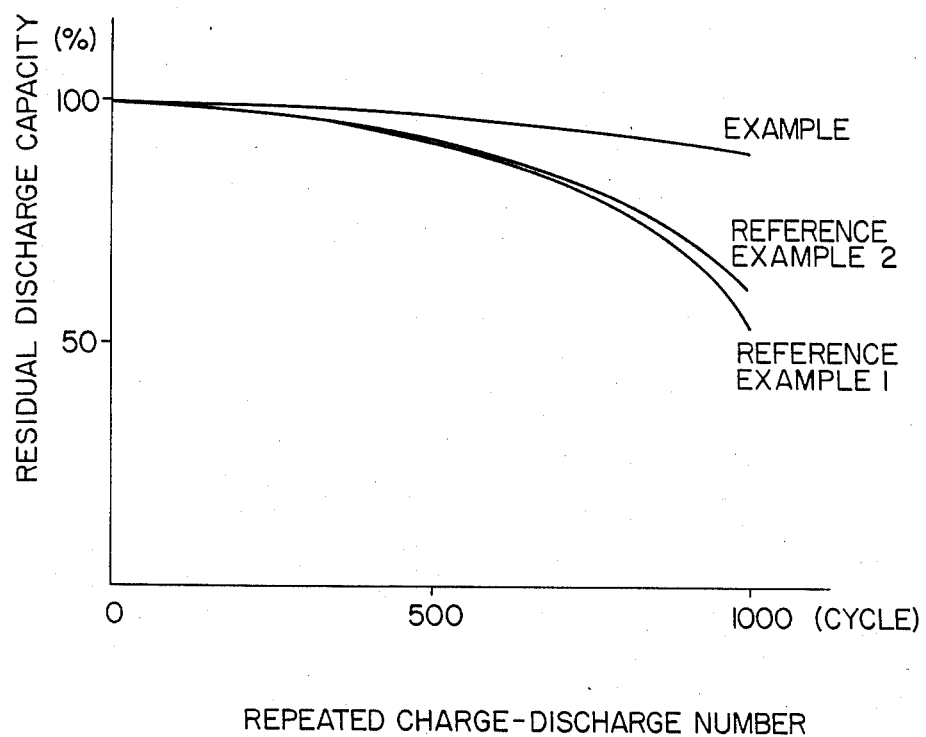

SEPARATOR FOR AN ALKALINE BATTERY

BACKGROUND OF THE INVENTION

The present invention is in a separator for an alkaline battery and more particularly in a separator of a non-woven fabric of polyamide fibers.

Conventionally non-woven fabrics formed from nylon 6 and nylon 66 and such non-woven fabrics of polyolefin fibers have been used for separators in alkaline batteries. The separators from the non-woven fabric of nylon 6 and nylon 66 have excellent electrolyte retainability and discharge capacity, and thus can be used favorably for a high discharge rate. However, these fabrics have inferior alkali resistance at high temperature and inferior oxidation resistance. A disadvantage of the conventional polyamide separator is that sulfate and carbonate radicals are generated by fiber decomposition when such fibers are used in an alkaline battery. The battery life is thus shortened.

The separators of non-woven fabric from polyolefin fibers have excellent alkali resistance and oxidation resistance. A disadvantage of the polyolefin separator is they have inferior electrolyte retainability. Such separators leak in a short time when used at high discharge rates.

Various modifications have been tried to eliminate these disadvantages. Non-woven fabric comprising polyolefin fibers which are natively excellent in alkali resistance and oxidation resistance have been subjected to hydrophilic treatment with a surface active agent. Micro-fine fibers have been used as the polyolefin fibers practically used to increase electrolyte retainability. However, such a modification is only temporarily effective or insufficient for use at a high discharge rate due to the inherent hydrophobic property of polyolefin fibers.

Blends of nylon 6 or nylon 66 with polyolefin fibers in a prescribed proportion have been tried to satisfy both electrolyte retainability and alkali resistance/oxidation resistance requirements. However, since nylon 6 and nylon 66 are selectively deteriorated by alkaline electrolyte, any only temporary effectiveness can be achieved.

An object of the present invention is to obtain a separator with excellent electrolyte retainability and having improved alkali resistance and oxidation resistance at high temperature.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The figure illustrates the relation between the repeated charge-discharge number (cycle) and percent residual capacity for batteries in which separators of the Example, and Reference Examples 1 and 2 are incorporated.

THE INVENTION

The present invention is in a separator in alkaline batteries and more particularly is in a separator for alkaline batteries comprising a non-woven fabric of polyamide fibers, wherein the numerical $CONH/CH_2$ ratio of the polyamide resin which forms the polyamide fibers of the fabric is from 1/9 to 1/12.

It has been found that polyamide fibers having the $CONH/CH_2$ ratio in the polymer backbone of from 1/9 to 1/12 exhibit excellent alkali resistance and oxidation resistance and also sufficient hydrophilic property for retaining alkaline electrolyte even though the fibers comprise polyamide.

The $CONH/CH_2$ ratio of the present invention is the ratio of the number of amide groups (—CONH—) to the number of methylene groups (—$CH_2$—). For example, the ratio for nylon 6 and nylon 66 is estimated to be 1/5 from the repeating unit. Therefore polyamide fibers in accordance with the present invention include nylon 1010, nylon 11, nylon 12, and nylon 13. It has been found that separators of polyamide fibers having a $CONH/CH_2$ ratio larger than 1/9 are inferior in alkaline and oxidation resistance. It has also been found that such separators are insufficiently hydrophilic and inferior in the retainability of electrolyte if the polyamide fibers have a $CONH/CH_2$ ratio of less than 1/12. While blends are useable in the invention, if it is not more than 20 to 30%, improved separator properties will not result.

A non-woven fabric in accordance with the present invention may be prepared by any known process such as a dry laying or a wet process. The process is not restricted to any specific manufacturing process. However, when non-woven fabric comprising 100% polyamide fibers having a $CONH/CH_2$ ratio of 1/9 to 1/12, and containing essentially no-binder and no other fibers is required, non-woven fabric prepared by the "melt blown" process is preferred.

In the melt blown process, the fibers are melt-spun from nozzles when a polymer resin in a molten state is extruded into a hot air stream through a row of heated nozzle orifices and form fine fibers. The fibers are collected on a collecting plane. Non-woven fabric comprising essentially continuous micro-fine fibers with an average fiber diameter of $10\mu$ or less is obtained by this process. Thus, the retainability of electrolyte is greatly improved due to the increased contact area with electrolyte. However, if the average fiber diameter is less than $3\mu$, the non-woven fabric becomes excessively dense and the fabric prevents the movement of gas generated at the electrodes. Thus a numerical average fiber diameter of from 3 to $10\mu$ is desirable, and a diameter of from 5 to $8\mu$ is preferable.

If non-woven fabric is prepared by the above-mentioned melt-blown process, the spun fibers, while self-adhesive, are collected on a moving collecting plane, which makes an angle of 5 to 80 degrees to the blow direction of the fibers to form a web. The fibers are oriented to the moving direction of the collecting plane. The fiber web is then stretched to the moving direction of the collecting plane so as to orient the fiber mostly to a certain direction and draw the fiber in that direction. The non-woven fabric will have excellent strength in a certain direction. The resultant non-woven fabric is preferable for the separator in accordance with the present invention. The preferable apparent density of the resulting non-woven fabric is from 0.2 to 0.8 g/cm$^3$.

If a further improved electrolyte retainability or hydrophilic property of the fibers is required, the fiber may be treated with a surface active agent. Nonionic surface active agents, such as polyoxyethylenenonylphenyl ether, having excellent alkali resistance and a Hydrophilic Lipophilic Balance (HLB) value range from 12 to 15 can be effectively used.

EXAMPLE

Nylon 12 having a CONH/CH$_2$ ratio of 1/11 was fed to an extruder and melted. The molten polymer was spun from orifices having a 0.3 mm diameter, heated at 350° C., and provided in a straight arrangement at an extruding rate of 0.3 g/min. Simultaneously, hot compressed air at 380° C. was jetted from slits provided adjacent to both sides of the orifices to blow down and draw the fibers. The resulting fibers are collected on a collecting plane and a non-woven fabric comprising nylon 12 fibers with an average fiber diameter of 6μ was obtained. The apparent density of the fabric was 0.26 g/cm$^3$. Properties of the non-woven fabric as a battery separator are shown in the Table.

REFERENCE EXAMPLE 1

Non-woven fabric comprising continuous nylon 6 fibers with an average fiber diameter of 6μ was obtained by the same process as used in the above Example but nylon 6 having a CONH/CH$_2$ ratio of 1/5 was used in place of nylon 12. The apparent density of the fabric was 0.33 g/cm$^3$. The properties of this non-woven fabric as a battery separator are shown in the Table.

REFERENCE EXAMPLE 2

A web comprising 70% by weight of nylon 66 fibers and 30% by weight of sheath-and-core type conjugate fibers constituted of a nylon 6 sheath and nylon 66 core was formed, heated at 240° C. under no-pressure to melt nylon 6, to form a non-woven fabric. The apparent density of the fabric was 0.27 g/cm$^3$. The properties of this fabric as a battery separator are shown in the Table.

TABLE

| Properties | Example | Reference Example 1 | Reference Example 2 | Test method |
|---|---|---|---|---|
| Basis weight (g/m$^2$) | 72 | 72 | 75 | |
| Thickness (mm) | 0.28 | 0.22 | 0.28 | A |
| Alkali resistance (%) | 0.1 | 40 | 30 | B |
| Oxidation resistance (%) | 3.5 | Dissolve | Dissolve | C |
| Retainability of liquid | 250 | 260 | 250 | D |

Test procedures
A: Measurement by a micro-meter
B: Weight loss after immersion in a 30% KOH solution at 80° C. for 1000 hr.
C: Weight loss after immersion in a mixed solution comprising 250 ml of 5% KMnO$_4$ solution and 50 ml of 30% KOH solution at 50° C. for 1 hr.
D: Percent of the weight of retained liquid to that of the sample measured in a procedure in which the sample is immersed in a 30% KOH solution to saturate completely and taken out from the solution and the weight if measured after 10 min.

From the Table it is clear that value of retainability is approximately the same for the Example of the invention and Reference Examples 1 and 2, but the weight losses due to alkali and oxidation attack are only 0.1% and 3.5% respectively for the Example. In contrast, the Reference Examples 1 and 2 each exhibit significant weight loss (lack of alkali resistance) of 40% and 30% respectively. During the oxidation resistance test the fabric of the Reference Examples dissolved showing drastic deterioration. Accordingly, the non-woven fabrics of the Reference Examples cannot be used under the severe conditions such as high temperature.

The Figure shows the test results of battery performance. In the test procedure, the above-mentioned separators were incorporated in batteries of 1200 mAhr capacity and the batteries were subjected to a repeated charge-discharge cycle during which the % residual discharge capacity after appropriate cycles was measured and plotted. The abscissa of the graph is the Repeated number of charge-discharge cycles, and the ordinate is Residual discharge capacity. The residual discharge capacity is defined as percent ratio of the discharge capacity after appropriate cycles to the initial discharge capacity measured under conditions of the test temperature of 20° C., charge condition of 4 hours at 400 mA, and discharge condition of 2 hours at 1 ohm. It is clear from the Figure that when the separator of the invention is used, the discharge capacity remains substantially the same showing a slight decrease even after repeated cycles. The separator of the invention thus has significant longivity. In contrast, the discharge capacity for the Reference Examples decreases gradually and drops to a residual capacity of about 50% after 1000 cycles, showing that prior art separators have inferior durability.

The separator of the present invention thus has excellent alkali resistance/oxidation resistance and retainability of electrolyte, and can be successfully used to fabricate long life alkaline batteries for high rate discharge.

It will be understood that the specification and examples are illustrative but not limitative of the present invention and that other embodiments within the spirit and scope of the invention will suggest themselves to those skilled in the art.

We claim:

1. A rechargeable alkaline battery comprising:
   an anode;
   a cathode;
   an ion transporting, alkaline electrolyte in contact with said anode and cathode; and
   a separator
between said anode and cathode, said separator comprising a non-woven fabric of polyamide, said polyamide having a CONH/CH$_2$ ratio of from 1/9 to 1/12.

2. The battery of claim 1, wherein the polyamide is in the form of fibers which are essentially continuous filaments and have an average fiber diameter of 3 to 10μ.

3. The battery of claim 2, wherein the polyamide filaments are substantially unidirectionally oriented and drawn into said direction.

4. The battery of claim 2, wherein the average fiber diameter is 5 to 8 microns.

5. The battery of claim 1, wherein the non-woven fabric is formed of fibers produced by the spun-melt method.

6. The battery of claim 1, wherein the density of the non-woven fabric is from 0.2 to 0.8 g/cm$^3$, 7. The battery of claim 1, wherein the non-woven fabric is formed of fibers which have been treated with nonionic surfaces active agents.

8. In a rechargeable alkaline battery having a separator wherein the improvement comprises said separator being of a non-woven fabric of polyamide having a CONH/CH$_2$ ratio of from 1/9 to 1/12 and selected from the group consisting of nylon 11, nylon 12, nylon 13 and nylon 1010.

9. In the rechargeable alkaline battery of claim 8, the improvement further comprising that the polyamide is in the form of fibers which are essentially continuous filaments and have an average fiber diameter of 3 to 10μ.

10. In the rechargeable alkaline battery of claim 9, the improvement further comprising that the polyamide filaments are substantially unidirectionally oriented and drawn into said direction.

11. In the rechargeable alkaline battery of claim 9, the improvement further comprising that the average fiber diameter is 5 to 8 microns.

12. In the rechargeable alkaline battery of claim 8, the improvement further comprising that the non-woven fabric is formed of fibers produced by the spun-melt method.

13. In the rechargeable alkaline battery of claim 8, the improvement further comprising that the density of the non-woven fabric is from 0.2 to 0.8 g/cm$^3$.

14. In the rechargeable alkaline battery of claim 8, the improvement further comprising that the non-woven fabric is formed of fibers which have been treated with nonionic surface active agents.

15. A rechargeable alkaline battery comprising:
an anode;
a cathode;
an ion transporting, alkaline electrolyte in contact with said anode and cathode; and
a separator between said anode and cathode, said separator comprising a non-woven fabric of polyamide, said polyamide having a CONH/CH$_2$ ratio of from 1/9 to 1/12, wherein the polyamide is selected from the group consisting of nylon 11, nylon 12, nylon 13 and nylon 1010.

16. The battery of claim 15, wherein the polyamide is in the form of fibers which are essentially continuous filaments and have an average fiber diameter of 3 to 10μ.

17. The battery of claim 16, wherein the polyamide filaments are substantially unidirectionally oriented and drawn into said direction.

18. The battery of claim 16, wherein the average fiber diameter is 5 to 8 microns.

19. The battery of claim 15, wherein the non-woven fabric is formed of fibers produced by the spun-melt method.

20. The battery of claim 15, wherein the density of the non-woven fabric is from 0.2 to 0.8 g/cm$^3$, 21. The battery of claim 15, wherein the non-woven fabric is formed of fibers which have been treated with nonionic surface active agents.

* * * * *